United States Patent [19]
Shefte

[11] Patent Number: 5,499,654
[45] Date of Patent: Mar. 19, 1996

[54] TWO-WAY VENT VALVE

[75] Inventor: Peter W. Shefte, Menomonee Falls, Wis.

[73] Assignee: Applied Power Inc., Butler, Wis.

[21] Appl. No.: 441,520

[22] Filed: May 15, 1995

[51] Int. Cl.⁶ .................................................. F16K 17/19
[52] U.S. Cl. ................................ 137/493.9; 137/512.4; 220/203.16
[58] Field of Search ........................... 137/493, 493.9, 137/512.4, 843, 860; 220/203.16, 203.28

[56] References Cited

U.S. PATENT DOCUMENTS

| | | | |
|---|---|---|---|
| 2,679,946 | 6/1954 | Friend | 137/493.9 X |
| 3,124,488 | 3/1964 | Ruetschi | 137/493.9 X |
| 3,138,173 | 6/1964 | Hartman | 137/493.8 |
| 3,319,879 | 5/1967 | Brown | 230/231 |
| 3,430,648 | 3/1969 | Botkin | 137/493 |
| 3,820,561 | 6/1974 | Papst et al. | 137/512.2 |
| 4,440,308 | 4/1984 | Baker | 220/204 |
| 4,922,954 | 5/1990 | Blomquist | 137/493 |
| 5,347,813 | 9/1994 | Yanagi | 137/493.9 X |

*Primary Examiner*—Robert G. Nilson
*Attorney, Agent, or Firm*—Quarles & Brady

[57] ABSTRACT

A liquid tank cap incorporates a two-way relief valve in which an annular valve disc has one side sealed against a seal adjacent to its inner diameter and the other side sealed against a seal adjacent to its outside diameter. When subjected to a pressure differential in either direction, the disc deflects so as to increase its concavity and allow air passage by one or the other seal, depending upon whether the pressure in the tank is subatmospheric or superatmospheric.

7 Claims, 1 Drawing Sheet

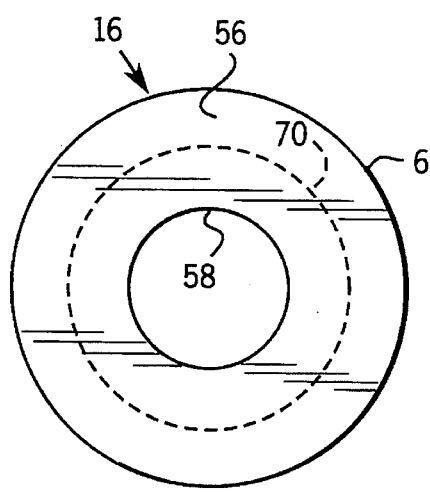
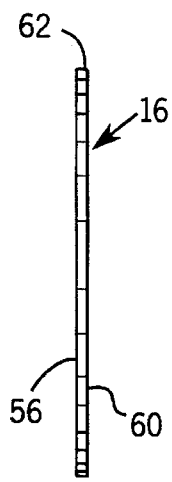
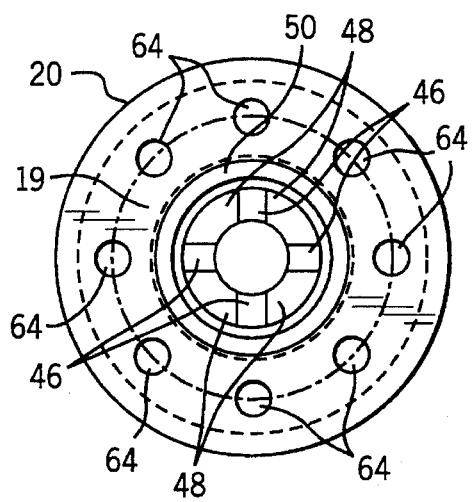
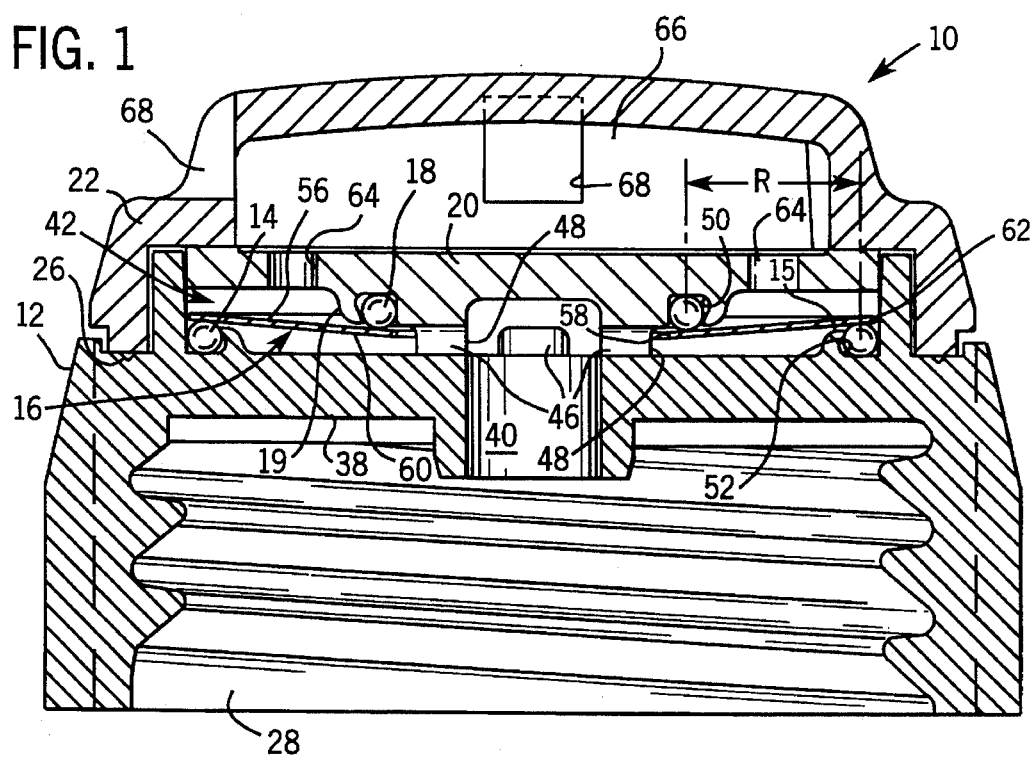

5,499,654

TWO-WAY VENT VALVE

BACKGROUND OF THE INVENTION

1. Field of the Invention

This invention relates to vent valves, and in particular to a two-way vent valve specially adapted to equalize the pressure inside a liquid holding tank or reservoir to atmospheric pressure.

2. Discussion of the Prior Art

Hydraulic fluid is drawn from or added back to a hydraulic fluid reservoir, for example of a pump, according to the needs of the pump or hydraulic load to which the fluid is supplied. There is typically an air space in the reservoir, the volume of which varies with the amount of hydraulic fluid in the reservoir at any given time. When hydraulic fluid is drawn from the reservoir, the volume of the air space increases, and unless atmospheric pressure is admitted into the air space, a subatmospheric vacuum is drawn in the reservoir, which hampers the flow of hydraulic fluid out of the reservoir. If, on the other hand, fluid is added back into the reservoir, the volume of the air space is reduced, resulting in an increased, or superatmospheric, pressure, which acts on the fluid in the reservoir and is also undesirable.

The prior art has sought to provide a two-way vent valve in the filler cap of a liquid tank. However, many of these attempts have required many parts, parts which were difficult to make, or assemblies which resulted in inconsistent results, the pressure differential required to open the valve varying considerably. In addition, the purpose of these valves is to allow equalization of the pressure within the tank, without allowing egress of the liquid from the tank through the valve. In other words, the valve had to allow the passage of air at a certain low pressure differential, but not allow the passage of liquid.

SUMMARY OF THE INVENTION

The invention provides a two-way vent valve which satisfies these needs in an economical and easy to manufacture structure. A housing of the valve defines a breather chamber, having a first passageway opening to a first side of the breather chamber and a second passageway opening to a second side of the breather chamber which is opposite from the first side. An annular valve disc is received in the breather chamber between the first and second sides of the chamber. One circular seal which is coaxial with the valve disc and of one diameter creates a liquid tight seal with one of the sides of the disc and another coaxial circular seal of a different diameter creates a liquid tight seal against the other side of the disc between the passageways. The disc deflects away from one seal or the other so as to relieve a pressure differential across it, depending on the direction of the pressure differential, to equalize the pressure across it.

In a preferred form, the housing is a cap for a liquid tank and the pressure inside the tank is equalized to atmospheric pressure. Thus, as liquid is drawn from or added to the tank, the pressure inside the tank remains relatively constant.

These and other objects and advantages of the invention will be apparent from the drawings and the detailed description.

BRIEF DESCRIPTION OF THE DRAWINGS

FIG. 1 is a cross-sectional view of a fluid reservoir fill cap incorporating a two-way vent valve of the invention;

FIG. 2 is a top plan view of a valve disc for the cap of FIG. 1;

FIG. 3 is a side plan view of the valve disc of FIG. 2; and

FIG. 4 is a bottom plan view of a spacer for the cap of FIG. 1.

DETAILED DESCRIPTION OF THE PREFERRED EMBODIMENTS

FIG. 1 illustrates a reservoir cap assembly 10 which incorporates a two-way vent valve of the invention. The cap 10 includes a base 12, an outer seal 14, a valve disc 16, an inner seal 18, a spacer 20 and a cover 22. The base 12, spacer 20 and cover 22 are a molded plastic material, such as nylon, the seals 14 and 18 may be O-rings which have a circular cross-section and are, as is well-known, an elastomeric material, and the valve disc 16 is a resilient material, such as stainless steel or plastic, and is relatively thin, for example 0.008 inches nominally if it is made of stainless steel.

The cover 22 is ultrasonically welded to the base 12 for its entire circular periphery as indicated at 26. Base 12 has its inside diameter threaded as indicated at 28 so as to be screwed on a neck of the reservoir tank (not shown), and is closed at its end 30 which is toward the cover 22 except for a central hole 40 which extends through end 38. Hole 40 leads from inside base 12 to a breather chamber in which spacer 20 is sandwiched between cover 22 and base 12.

At its upper end, hole 40 opens into a central cavity 44 which is formed in the spacer 20 and four passageways 46 emanate outwardly from the cavity 44 between legs 48 of the spacer 20. Radially outward of the legs 48, inner seal 18 is captured in groove 50 which is formed in the underside of the spacer 20 and outer seal 14 is captured in groove 52 which is formed on the upper side of the base 12. The seals 18 and 14 are captured in the grooves 50 and 52 by respective ridges 19 and 15 so as to be coaxial and radially spaced apart, being of different diameters.

Valve disc 16, which when unstressed is flat as shown in FIG. 3, seals on the inside of its concavely shaped upper surface 56 against coaxial inner seal 18, adjacent to its inside edge 58 and seals at the outside of its convexly shaped lower surface 60 against coaxial outer seal 14, adjacent to its outside edge 62. A series of angularly spaced holes 64 are formed through the spacer 20 above valve disc 16 which open into vent chamber 66, which is defined between the cover 22 and the spacer 20. Chamber 66 is open to atmosphere through openings 68 formed in the cover 22.

As shown in FIG. 1, when the cover 22 is ultrasonically welded to the base 12, it pushes against the spacer 20, which in turn compresses the seal 18 against valve disc 16 so as to prestress the valve disc 16 into the frusto-conical configuration shown in FIG. 1. Thus, due to the internal resiliency of the disc 16, the disc 16 presses on its upper side 56 adjacent to its inside edge 58 against the smaller seal 18 to create a liquid tight seal and presses on its lower side 60 adjacent its outer edge 62 against the larger outer seal 14 to create a liquid tight seal there.

At a certain differential pressure, either seal may be broken so as to allow the passage of air past the seal. For example, if the pressure inside the tank is higher than atmospheric pressure, for example by at least 3 psi, the outside of valve disc 16 will deflect upwardly so as to break the seal between itself and outer seal 14, so that valve disc 16 lifts off of seal 14, to allow air to flow from below valve disk 16 past seal 14 and past edge 62 to exit through openings 64 and 68. If, on the other hand, the pressure inside the tank is subatmospheric by at least 5 psi, the inside of valve disc 16 will deflect downwardly so as to break the seal between itself and seal 18, thereby allowing air flow from above disc 16 past seal 18 and past inner edge 58 through openings 46, 44 and 40 and into the tank so as to relieve the vacuum within the tank. Thus, with the outside of disc 16 deflecting upwardly or the inside of disc 16 deflecting downwardly, the disc 16 always deflects so as to increase its concavity (or convexity) to equalize the pressure across it.

The prestress within the valve disc 16 is created by the seals 14 and 18 creating a moment which acts between the seals 14 and 18 and is resisted by the valve disc 16. This results from the seals 14 and 18 being radially spaced apart and pressing against the valve disc 16 on opposite sides of the disc 16. As shown, the seals 14 and 18 are spaced apart radially by a distance R.

In the preferred embodiment, the outside diameter of the disc 16 is nominally 1.312 inches and the inside diameter of the disc 16 is nominally 0.505 inches. The size and thickness of the disc, and the amount of prestress to which it is subjected, determines the pressure required to open the valve. Although as shown the o-rings are closely adjacent to the respective inner and outer diameters of the disc, they need not be, and they need not be equidistantly spaced from the circumferential centerline 70 of the disc. For example, in the preferred embodiment, the circumferential centerline of the disc has a diameter of 0.9085 inches, but the median centerline between the o-rings has a diameter of 0.9175 inches. In the preferred embodiment, the o-rings have centerlines of approximately 1.258 and 0.578 inches, respectively, when installed.

Many modifications and variations to the preferred embodiments described will be apparent to those skilled in the art. For example, a vent valve of the invention need not be incorporated in a vent cap or even need not open to atmospheric pressure, but could be used, for example, between reservoirs or in a system where neither side opens to atmosphere. Therefore, the invention should not be limited to the embodiments described, but should be defined by the claims which follow.

We claim:

1. A two-way vent valve, comprising:

a housing defining a breather chamber therein, a first passageway opening to a first side of said breather chamber and a second passageway opening to a second side of said breather chamber, said second side being opposite from said first side;

an annular valve disc received in said breather chamber between said first and second sides of said chamber, said disc having a first side facing said first side of said breather chamber, a second side opposite from said first side and facing said second side of said breather chamber, an outer diameter edge and an inner diameter edge; and a pair of circular seals coaxial with said disc, one of said seals being of one diameter and creating a liquid tight seal with one of said sides of said disc between said passageways and the other said seal being of a different diameter and creating a liquid tight seal against the other side of said disc between said passageways.

2. A relief valve as claimed in claim 1, wherein said housing is a cap for a liquid tank.

3. A relief valve as claimed in claim 1, wherein said disc element is prestressed.

4. A relief valve as claimed in claim 3, wherein said disc element is prestressed into a frusto-conical shape.

5. A relief valve as claimed in claim 1, wherein said seals are provided by O-rings.

6. A relief valve as claimed in claim 1, wherein said housing is a cap for a liquid tank and one of said passageways opens to atmospheric pressure and the other passageway opens to the inside of the tank.

7. A relief valve as claimed in claim 1, wherein said disc is prestressed into a frusto-conical shape with one of said sides being concave and the other said side being convex, and said seal against said concave side is smaller in diameter than said seal which is against said convex side.

\* \* \* \* \*